US009563794B2

(12) United States Patent
Davis et al.

(10) Patent No.: US 9,563,794 B2
(45) Date of Patent: Feb. 7, 2017

(54) METHOD FOR UPGRADING RFID READERS IN SITU

(75) Inventors: Michael L. Davis, Amherst, NY (US); Tam Hulusi, Santa Ana, CA (US); Debra Spitler, Irvine, CA (US)

(73) Assignee: ASSA ABLOY AB (SE)

( * ) Notice: Subject to any disclaimer, the term of this patent is extended or adjusted under 35 U.S.C. 154(b) by 164 days.

(21) Appl. No.: 14/004,924

(22) PCT Filed: Mar. 16, 2012

(86) PCT No.: PCT/US2012/029371
§ 371 (c)(1),
(2), (4) Date: Jan. 16, 2014

(87) PCT Pub. No.: WO2012/125897
PCT Pub. Date: Sep. 20, 2012

(65) Prior Publication Data
US 2014/0320261 A1 Oct. 30, 2014

Related U.S. Application Data

(60) Provisional application No. 61/453,844, filed on Mar. 17, 2011.

(51) Int. Cl.
*G05B 19/00* (2006.01)
*G06K 7/10* (2006.01)
(Continued)

(52) U.S. Cl.
CPC .......... *G06K 7/10227* (2013.01); *G06K 7/0008* (2013.01); *G06K 7/10009* (2013.01); *G06K 7/10287* (2013.01); *G07C 9/00007* (2013.01)

(58) Field of Classification Search
CPC .............. G06K 7/10227; G06K 7/0008; G06K 7/10009; G06K 7/10287; G06K 7/10356; G06K 7/10297; G06K 7/10316; G06K 17/0022; G06K 2017/007; G06K 7/10; G07C 9/00007; G05B 19/00; G06F 19/328
(Continued)

(56) References Cited

U.S. PATENT DOCUMENTS 5,952,935 A 9/1999 Mejia et al.
6,903,656 B1 * 6/2005 Lee ............................ 340/572.1
(Continued)

FOREIGN PATENT DOCUMENTS

EP 2157526 2/2010
WO WO 2007/028634 3/2007
(Continued)

OTHER PUBLICATIONS

Extended Search Report for European Patent Application No. 12757113.1, dated Aug. 28, 2014 6 pages.
(Continued)

*Primary Examiner* — Travis Hunnings
(74) *Attorney, Agent, or Firm* — Sheridan Ross P.C.

(57) ABSTRACT

A reader-enhancing device is proposed which enables an in situ upgrade of readers having limited processing capabilities. The reader-enhancing device includes an emulation module that is capable of generating an output which emulates a first type of credential when the reader-enhancing device receives an input that is not in a format used by the first type of credential. The output generated by the emulation module enables the reader to respond to the input even though the input is not in a format natively supported by the reader.

22 Claims, 11 Drawing Sheets

(51) Int. Cl.
*G06K 7/00* (2006.01)
*G07C 9/00* (2006.01)

(58) Field of Classification Search
USPC .......................................... 340/5.61
See application file for complete search history.

(56) References Cited

U.S. PATENT DOCUMENTS

| | | | |
|---|---|---|---|
| 7,253,717 B2 * | 8/2007 | Armstrong et al. | 340/10.2 |
| 7,392,943 B2 | 7/2008 | Rietveld | |
| 7,407,110 B2 | 8/2008 | Davis et al. | |
| 7,439,860 B2 * | 10/2008 | Andresky | 340/572.1 |
| 7,439,862 B2 | 10/2008 | Quan | |
| 7,571,863 B2 * | 8/2009 | Lauper | 235/492 |
| 7,592,898 B1 * | 9/2009 | Ovard et al. | 340/10.4 |
| 7,690,579 B2 * | 4/2010 | Adams et al. | 235/492 |
| 7,701,348 B2 | 4/2010 | Kim | |
| 7,782,209 B2 | 8/2010 | Lowe et al. | |
| 8,183,980 B2 | 5/2012 | Davis et al. | |
| 8,281,994 B1 * | 10/2012 | Wass et al. | 235/385 |
| 2004/0065734 A1 * | 4/2004 | Piikivi | 235/451 |
| 2004/0094625 A1 | 5/2004 | Klosa et al. | |
| 2004/0196143 A1 * | 10/2004 | Crump et al. | 340/10.1 |
| 2004/0221151 A1 * | 11/2004 | Kajita | 713/2 |
| 2006/0226969 A1 * | 10/2006 | Bandy | 340/505 |
| 2006/0280149 A1 * | 12/2006 | Kuhl et al. | 370/338 |
| 2007/0057057 A1 | 3/2007 | Andresky et al. | |
| 2007/0080806 A1 * | 4/2007 | Lax et al. | 340/572.1 |
| 2007/0174907 A1 | 7/2007 | Davis | |
| 2008/0001746 A1 * | 1/2008 | Childress et al. | 340/572.1 |
| 2008/0143519 A1 * | 6/2008 | Piotrowski | 340/540 |
| 2008/0157968 A1 * | 7/2008 | Cunningham et al. | 340/572.1 |
| 2008/0234999 A1 * | 9/2008 | Cohen et al. | 703/26 |
| 2008/0235000 A1 * | 9/2008 | Cohen et al. | 703/26 |
| 2008/0235711 A1 * | 9/2008 | Cohen et al. | 719/318 |
| 2009/0009296 A1 * | 1/2009 | Shafer | 340/10.1 |
| 2009/0166421 A1 | 7/2009 | Finn | |
| 2009/0184826 A1 * | 7/2009 | Kim | 340/572.4 |
| 2010/0026458 A1 * | 2/2010 | Samdahl et al. | 340/10.1 |
| 2010/0034375 A1 | 2/2010 | Davis et al. | |
| 2011/0143661 A1 * | 6/2011 | Hartwig et al. | 455/41.1 |
| 2012/0066643 A1 * | 3/2012 | McRae | 715/810 |
| 2012/0147798 A1 * | 6/2012 | Miller et al. | 370/310 |

FOREIGN PATENT DOCUMENTS

| | | |
|---|---|---|
| WO | WO 2008/017889 | 2/2008 |
| WO | WO 2009/008861 | 1/2009 |
| WO | WO 2012036567 A1 * | 3/2012 |

OTHER PUBLICATIONS

Davis "Migration Strategies (With an Emphasis on Moving from 125 kHz Prox to 13.56 MHz Contactless Smart Card Technology)," NIST Workshop on Storage & Processor Card-Based Technologies, Jul. 8, 2003, 28 pages.

International Search Report and Written Opinion for International (PCT) Patent Application No. PCT/US2012/029371, mailed Jun. 12, 2012 12 pages.

International Preliminary Report on Patentability for International (PCT) Patent Application No. PCT/US2012/029371, mailed Oct. 31, 2013 11 pages.

* cited by examiner

METHOD FOR UPGRADING RFID READERS IN SITU

CROSS REFERENCE TO RELATED APPLICATION

This application is a national stage application under 35 U.S.C. 371 of PCT Application No. PCT/US2012/029371 having an international filing date of Mar. 16, 2012, which designated the United States, which PCT application claimed the benefit of U.S. Application Ser. No. 61/453,844, filed Mar. 17, 2011, both of which are incorporated by reference in their entirety.

FIELD OF THE DISCLOSURE

The present disclosure is generally directed toward updating RFID readers.

BACKGROUND

Radio Frequency Identification (RFID) is a well established machine-readable technology used in many applications including physical access control and logical access control.

A specific initial type of RFID technology, 125 kHz proximity technology, displaced other popular predecessor technologies such as Wiegand and magnetic stripe due to its non-contact convenience and ability to work in harsh environmental locations as well as its higher immunity to vandalism. There now exits a need to move to a "next generation" RFID technology, which is currently ISO standardized and based on 13.56 MHz carrier frequencies. This second generation technology offers all of the advantages of its predecessor and adds higher security, more data memory, and multi-application capabilities.

Although this second generation RFID technology is now displacing the predecessor legacy 125 kHz proximity technology, there is still an extremely large installed base of both readers and credentials which utilize the 125 kHz proximity technology. It is estimated that tens of millions of legacy readers and hundreds of millions of legacy credentials are still in use, even though a superior second generation RFID technology is available. There are many approaches to tackling this enormous upgrade task and one solution includes replacing existing credentials with a multi-technology credentials that are compatible with both the legacy RFID technology and the second generation RFID technology in a single credential. Since this multi-technology credential can be read by both legacy 125 kHz RFID readers and newer 13.56 MHz RFID readers, once all of the credentials are replaced with multi-technology credentials, reader replacements can begin since the newly replaced credentials will work on both the legacy readers and the new readers. Unfortunately, this solution is a logistical nightmare, if implemented within a relatively short window of time, primarily because re-badging employees is very time consuming and costly.

Another solution, similar to the multi-technology card replacement method, focuses on the same approach in which existing legacy readers are replaced with multi-technology readers that are capable of reading both the legacy 125 kHz RFID credentials and the newer 13.56 MHz RFID credentials. However, since reader installation represents a significant portion of the upgrade costs due to the expense of both skilled and trusted labor, it would be highly desirable to be able to simply and conveniently upgrade readers without actually replacing them.

The ideal solution would be to convert existing readers in situ while allowing for the natural transition of legacy credentials to new credentials in the normal course of business as employees are hired and fired or request replacement credentials that are lost or otherwise misplaced. Such a solution could be executed on a time scale that suits the needs of a site instead of a process that hastens the transition which is both disruptive and costly. Moreover, the ideal solution would not require existing readers to be removed from the wall to be replaced with either a new single technology replacement reader (after the original cards were all replaced with the new cards) or be replaced with a more costly multi-technology reader that supports both the legacy credential and the new credential.

SUMMARY

It is, therefore, one aspect of the present disclosure to provide a solution to the above-described problem by the use of a reader-enhancing device (e.g., face-plate, auxiliary device, attachment, etc.) that is attached to the front of, side of, or next to an existing RFID reader. As used herein, the term "existing RFID reader" will be used to mean the existing or installed reader. The reader-enhancing device would add the capability of reading the second generation credentials while still allowing the first-generation legacy credentials to be read. Although the term "face-plate" may generally be used to refer to the reader-enhancing device disclosed herein, one skilled in the art will appreciate that the "face-plate" does not necessarily have to be physically positioned on the face of an existing reader, nor does the device have to be provided in the form of a plate. Rather, any physical configuration of a device or collection of devices used to augment and/or enhance the operation of an existing reader by connecting on or near the reader are within this broad definition.

This reader-enhancing device has other desirable features as well. For example, it is well known that one of the current weak links in reader security is the communications between the reader and an upstream device. Modern communication protocols, such as TCP/IP, are much more secure than older protocols, but legacy readers typically use the Wiegand protocol which has been compromised by Zac Franken.

Embodiments of the present disclosure have overcome this security vulnerability by encrypting the data that is sent to the legacy reader by the emulation of a credential. Of course just encryption alone does not overcome replay attacks, so the encryption scheme utilized can employ a mechanism, such as a rolling code, to make sure that the credential data is different every time. Several schemes of implementing rolling codes to ensure this enhanced security is provided are described in U.S. Patent Publication Nos. 2006/0464912 and 2010/0034375 filed Aug. 16, 2006, and Aug. 10, 2009, respectively, both of which are incorporated herein by reference in their entirety. Of course, the encrypted changing credential data read by the legacy reader and subsequently sent to the upstream device must be received by an upstream device that contains the necessary algorithms to properly decode the received data.

Another security improvement of the present disclosure is that addition of a reader-enhancing device to a reader can be used to add a second factor of authentication to existing readers (be they legacy or second generation). Addition of a second factor of authentication renders cloned or spoofed credentials useless without the second authentication factor. One of the second factors of authentication that can be easily added to an existing legacy reader is a keypad (i.e., the first factor of authentication may correspond to the "something you have" in the form of the credential while the second factor of authentication may correspond to the "something you know" in the form of a user-provided PIN or password).

In some embodiments, the reader-enhancing device proposed herein is attached to the front of the original reader and utilizes as its power input at least some power provided from the RF field of the reader. When button presses are received at the reader-enhancing device, the reader-enhancing device then communicates either single button presses or a complete sequence of key presses by presenting encoded versions of the button presses to the reader as an emulated virtual credential. And with the greater memory and security functionality of the new credential technology, a PIN code could be securely stored in the credential itself and compared to the PIN entered and only emulated upon a successful comparison.

In a similar fashion to the keypad described above, biometric data could be used as the second factor of authentication (i.e., "something you are"). In such an embodiment, the reader-enhancing device added to the existing reader may comprise a biometric device. Similar to the keypad, the biometric device could be attached to the front of an already-installed reader. The biometric device may compare the received biometric data with a locally-maintained list of authorized user's biometric templates to determine if the biometric data matches at least one template stored thereon. If a match is found, the biometric device may then emulate a valid credential and provide such valid credential data to the existing reader on which the reader-enhancing device resides.

Also, to increase security of legacy technology, commonly used and readily available legacy formats could be turned off with the communications between the legacy (or existing) reader and the reader-enhancing device using either an obscure format or a more secure format, such as those described in U.S. Pat. No. 7,407,110 to Davis et al., the entire contents of which are hereby incorporated herein by reference.

Since many legacy readers can be programmed by the use of "configuration cards" also called "command cards" (examples of which are described in U.S. Pat. No. 7,392,943, the entire contents of which are hereby incorporated herein by reference, the reader-enhancing device described herein can automatically generate the required command cards to disable all formats except the one being used for communications between the reader and the reader-enhancing device. And, of course, the reader-enhancing device itself could use command cards to change its operating characteristics or even use cards or an NFC-enabled device to upgrade its firmware.

Another security enhancement which may be implemented with the reader-enhancing device described herein is that the reader-enhancing device may be configured to disable all legacy credentials from being read by the legacy reader by using a "jamming" technique in which the reader-enhancing device generates interference signals whenever legacy credentials are being read. Of course, the jamming is not done during the time the face-plate communicates with the legacy reader. Note that attempts to read a legacy credential during the time when face-plate to legacy communications are taking place would likely not work since there would be an RF collision that the legacy technology does not properly handle.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
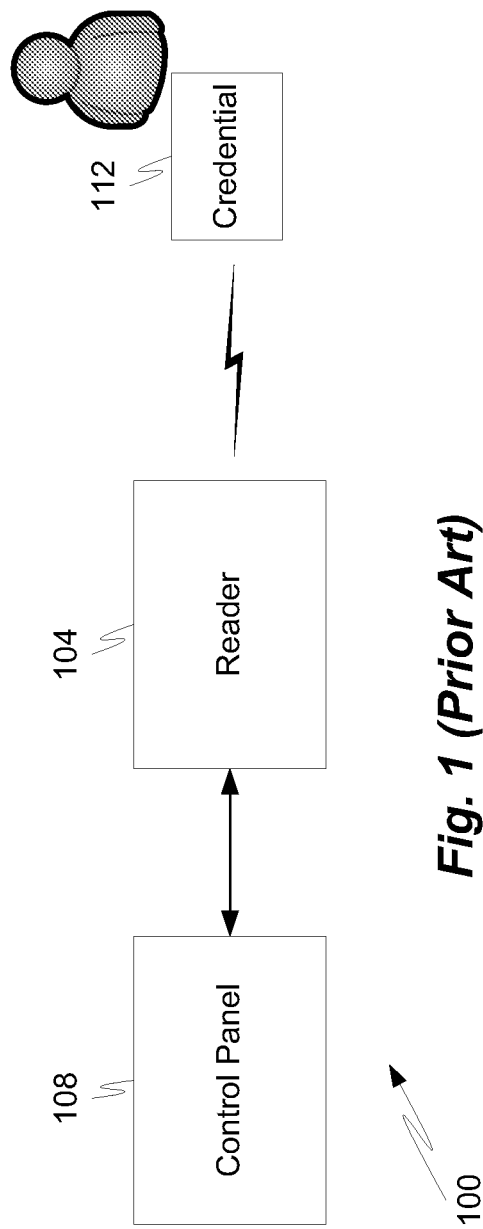
FIG. 1 is a block diagram of an access control system in accordance with embodiments of the prior art.

FIG. 1 shows an illustrative embodiment of an access control system 100 in accordance with embodiments of the prior art. The reader 104 is generally provided at a strategic location to secure one or more assets. In some embodiments, the reader 104 is in communication with a control panel 108 via a first communication link. Such a reader 104 is referred to as a networked reader because the reader 104 provides some or all data used in making an access control decision to the control panel 108. The control panel 108 comprises the necessary functionality to analyze the data received from the reader 104 and make an access control decision for the reader 104. After the access control decision has been made at the control panel 108, the control panel 108 which is enabled to either release one or more assets if a decision has been made to grant access or maintain such assets in a secure state if a decision has been made to deny access, communicates the results of the decision back to the reader 104 to let the user know results of the decision.

One function of a reader 104 is to control access to certain assets. More specifically, a reader 104 may be positioned at an access point for a given asset (e.g., a door for a room, building, or safe, a computer for electronic files, and so on). Unless a proper credential 112 is presented to the reader 104, the access point is maintained in a secure state such that admittance or access to the asset is denied. If a credential 112 having authority to access the asset is presented to the reader 104, then the reader 104 has the discretion to allow the user of the credential 112 access to the asset and implement various actions accordingly.

The credential 112 is a device that carries evidence of authority, status, rights, and/or entitlement to privileges for a holder of the credential 112. A credential 112 is a portable device having memory and a reader interface (i.e., an antenna and Integrated Circuit (IC) chip) which enables the credential 112 to exchange data with the reader 104. One example of a credential 112 is an RFID smartcard that has data stored thereon allowing a holder of the credential 112 to access an asset protected by a reader 104. Other examples of a credential 112 include, but are not limited to, proximity cards, access control cards, credit cards, debit cards, passports, identification cards, key fobs, Near Field Communications (NFC)-enabled cellular phones, Personal Digital Assistants (PDAs), tags, or any other device configurable to include a transponder or some other machine-readable device.

As used herein, the terms a "holder" and a "user" are used interchangeably in reference to an individual or an object associated with credential 112.

As noted above, the control panel 108 may be responsible for making some or all of the asset-access decisions based on data received at the reader 104 from the credential 112. In some embodiments, the reader 104 may not be connected to a control panel 108, in which case the reader 104 is referred to as a stand-alone reader. Stand-alone readers comprise the decision-making components necessary to analyze data received from a credential 112 and determine if the holder thereof is entitled to access an asset secured by the reader 104. Stand-alone readers are generally desirable in situations where a reader 104 is in an isolated location and a communication link between the control panel 108 and reader 104 is not easily established.

In configurations where the reader 104 is a networked reader, a communications network may be used to establish the communication link between the reader 104 and control panel 108. Exemplary communication networks may provide bi-directional communication capabilities, which may selectively be implemented in a form of wired, wireless, fiber-optic communication links, or combinations thereof. Even though the communication link between the control panel 108 and reader 104 is depicted as bi-directional, one skilled in the art can appreciate that the communication link may be unidirectional. As one example, the reader 104 may utilize the Wiegand protocol to communicate with the control panel 108.

The communication link between the reader 104 and control panel 108 may be implemented utilizing buses or other types of device connections. The protocols used to communicate between the control panel 108 and the reader 104 may include one or more of the TCP/IP protocol, RS 232, RS 485, Current Loop, Power of Ethernet (POE), Bluetooth, Zigbee, GSM, WiFi, and other communication methods and protocols known in the art.

The control panel 108 may be a general-purpose computer adapted for multi-task data processing and suitable for use in a commercial setting. Alternatively, the control panel 108 may be implemented as a host computer or server and the reader 104 can be connected to the host computer via a TCP/IP connection or other type of network connection. A memory comprising a database of records for the system 100 may be associated with the control panel 108. The database, although not depicted, may be integral with or separated from the control panel 108 or it may be incorporated into the reader 104. The database maintains records associated with the readers 104, credentials 112 and their respective holders or users, algorithm(s) for acquiring, decoding, verifying, and modifying data contained in the readers 104, algorithm(s) for testing authenticity and validity of the credentials 112, algorithm(s) for implementing actions based on the results of these tests, and other needed software programs. Specific configurations of the control panel 108 are determined based on and compliant with computing and interfacing capabilities of the readers 104.

As can be appreciated by one of ordinary skill in the art, the system 100 is limited to the capabilities of the reader 104. Thus, if the reader 104 is only configured to read a certain type of credential 112 or receive a certain type of input from a user, then the reader 104 will not be compatible for use with other credentials 112, which may provide increased security mechanisms than the credentials 112 with which the reader 104 is natively compatible. Likewise, if the reader 104 is only natively configured to verify a first factor of authentication (e.g., something a user has as evidenced by the credential 112), then the reader 104 will not be as secure as other readers which offer multi-factor authentication features (e.g., the ability to verify some a user has, something a user knows, something a user is, etc.). Accordingly, increasing the security of the system 100 is generally dependent upon updating the reader 104 functionality, which has traditionally been a costly endeavor.

Figure 2:
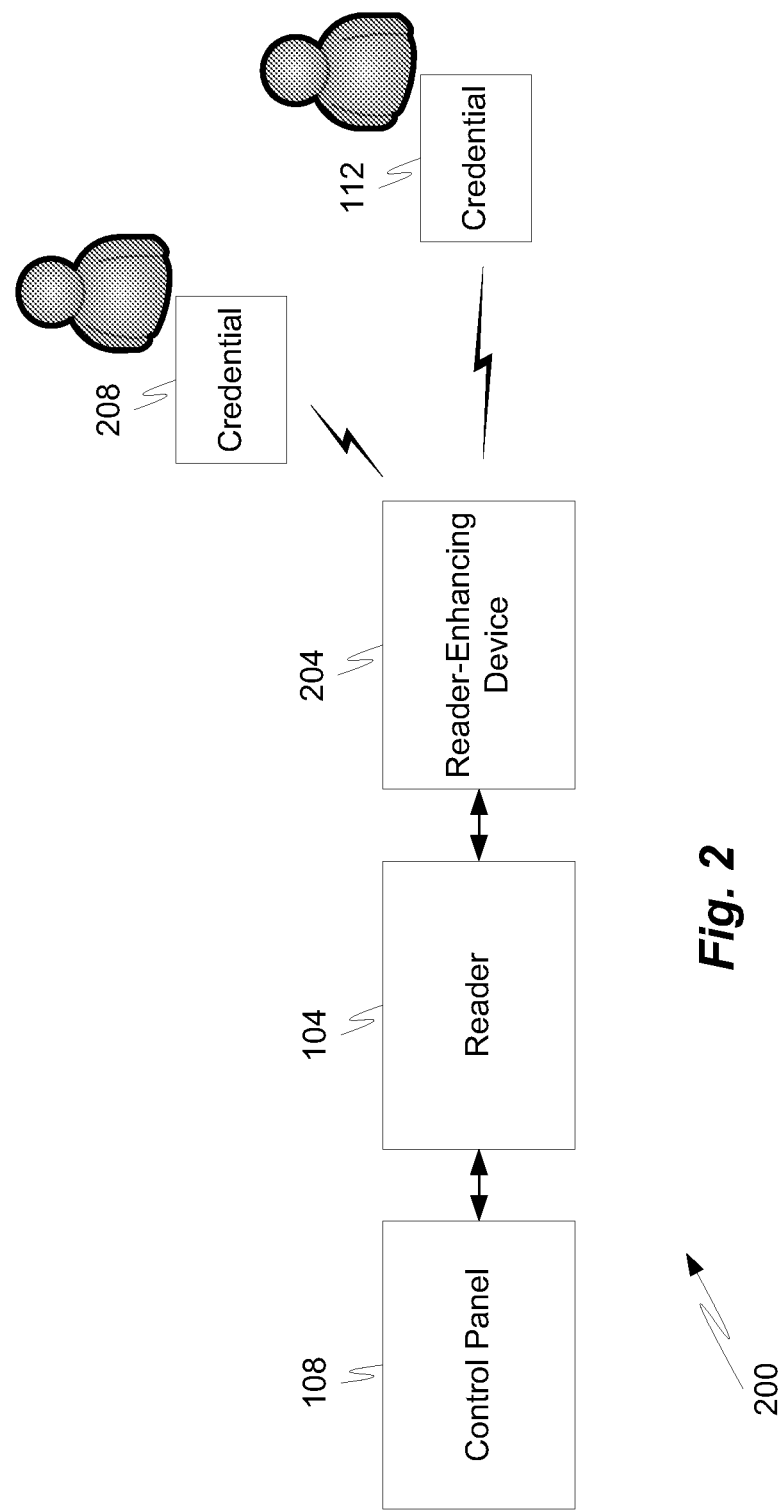
FIG. 2 is a block diagram of an access control system in accordance with embodiments of the present disclosure.

FIG. 2 depicts an exemplary access control system 200 in which the capabilities of the reader 104 are enhanced without physically replacing the reader 104 with an updated or upgraded reader. In particular, the access control system 200 includes a reader-enhancing device 204 that is in communication with the reader 104. The reader-enhancing device 204 enables the reader 104 to be compatible with both a first type of credential 112 (i.e., a legacy credential of the type which the reader 104 is natively compatible) and a second type of credential 208 (i.e., another credential that is different from the first type of credential 112). In some embodiments, the second credential 208 comprises additional security features and/or utilizes a different communication protocol to exchange data with the reader 104. In some embodiments, the first credential 112 is tuned to exchange messages with the reader 104 by using a carrier frequency of approximately 125 kHz whereas the second credential 208 is tuned to exchange messages with the reader 104 by using a carrier frequency of approximately 13.56 MHz.

The reader-enhancing device 204, in some embodiments, acts as a communications conduit between the reader 104 and both types of credentials 112, 208. In some embodiments, the reader 104 may still be enabled to communicate directly with the first type of credential 112, whereas the reader-enhancing device 204 is configured to read data from the second type of credential 208 on the reader's 204 behalf and (1) alter such data before providing the data to the reader 104 and/or (2) analyze such data and emulate a first type of credential if the data read from the second type of credential 208 is validated.

Another possible interaction between the reader 104 and reader-enhancing device 204 may include the reader-enhancing device 204 selectively or completely jamming communications between all credentials and the reader 104 such that all types of credentials are forced to communicate with the reader 104 through the reader-enhancing device. In some embodiments a passive jamming mechanism (e.g., metal plate, wire mesh, or any other interference-inducing material) may be utilized to interfere with communications of the reader 104. In some embodiments, an active jamming mechanism (e.g., selectively-engageable antenna which creates noise in the environment about the reader 104) may be utilized to interfere with communications of the reader 104. In may be the case that active jamming mechanisms are utilized to preclude wireless communications in a certain bandwidth or carrier frequency, whereas other jamming mechanisms are utilized to preclude all wireless communications.

Still another function of the reader-enhancing device 204 may be to add an additional factor of authentication to the access control system 100. In some embodiments, the reader 104 may only be natively configured to analyze a single factor of authentication. Thus, if that single factor of authentication is compromised (e.g., a first type of credential 112 is lost or stolen or a password or PIN has been compromised), then the security of the entire system 100 is at risk. Requiring a second factor of authentication (or more) ensures that no single breach in security will result in a complete compromise of the access control system 200. As one example, the reader-enhancing device 204 may comprise functionality which enables the reader-enhancing device 204 to receive, as an input, data related to both a first and second factor of authentication.

In some embodiments, the reader-enhancing device 204 may allow communications related to the first factor of authentication to pass directly to the reader 104 where they are either analyzed or subsequently provided to the control panel 108 for analysis. The reader-enhancing device 204 may also require, as a prerequisite to passing communications related to the first factor of authentication to the reader 104, that a user provide a second factor of authentication. Only upon determining that the second factor of authentication is valid does the reader-enhancing device allow the communications related to the first factor of authentication to pass to the reader 104. Therefore, the reader-enhancing device 204 provides an additional layer of security to the access control system 200 without requiring the replacement of the reader 104. To the contrary, the reader-enhancing device 204 enables the reader 104 to operate in its normal fashion while simultaneously providing additional security features to the system 200.

Although wireless communication links are depicted in FIGS. 1 and 2 as being established between a credential 112, 208 and a reader 104 or reader-enhancing device 204, one skilled in the art will appreciate that one or both types of credentials 112, 208 may be contact-based credentials and the communications between the credentials 112, 208 and the reader 104 or reader-enhancing device 204 may be contingent upon establishing contact between the devices. In some embodiments, one or both types of credentials 112 may comprise a magstripe card, a Wiegand card, or the like.

Additionally, it is not necessary that the reader-enhancing device 204 enable the reader 104 to communicate with multiple types of credentials 112, 208. Rather, the reader-enhancing device 204 may be configured to receive different types of inputs (e.g., keypad inputs, voice inputs, image inputs, etc.). The reader-enhancing device 208 may then either alter the different types of inputs to emulate an input of a first type of credential 112 or the reader-enhancing device 208 may analyze the different types of inputs, determine their validity, and emulate a valid credential if the analysis of such inputs determines that the inputs are valid. In some embodiments, the reader-enhancing device 208 may always emulate the same valid credential using the same data contained on the original legacy credential or the reader-enhancing device 208 may have a list of valid credential values that are sequentially or randomly provided to the reader 104 upon determining that a valid input has been received at the reader-enhancing device 204. It may even convert one manufacturer's credential into another manufacturer's credential similar to the paradigm discussed in U.S. Patent Publication No. 2014/0320261 A1 to Davis et al., the entire contents of which are hereby incorporated herein by reference. And it may even add additional security features to the original credential data so that it passes through the original reader through the communications path in a more secure fashion than it would have if merely the original credential data was converted into the new credential.

Figure 3:
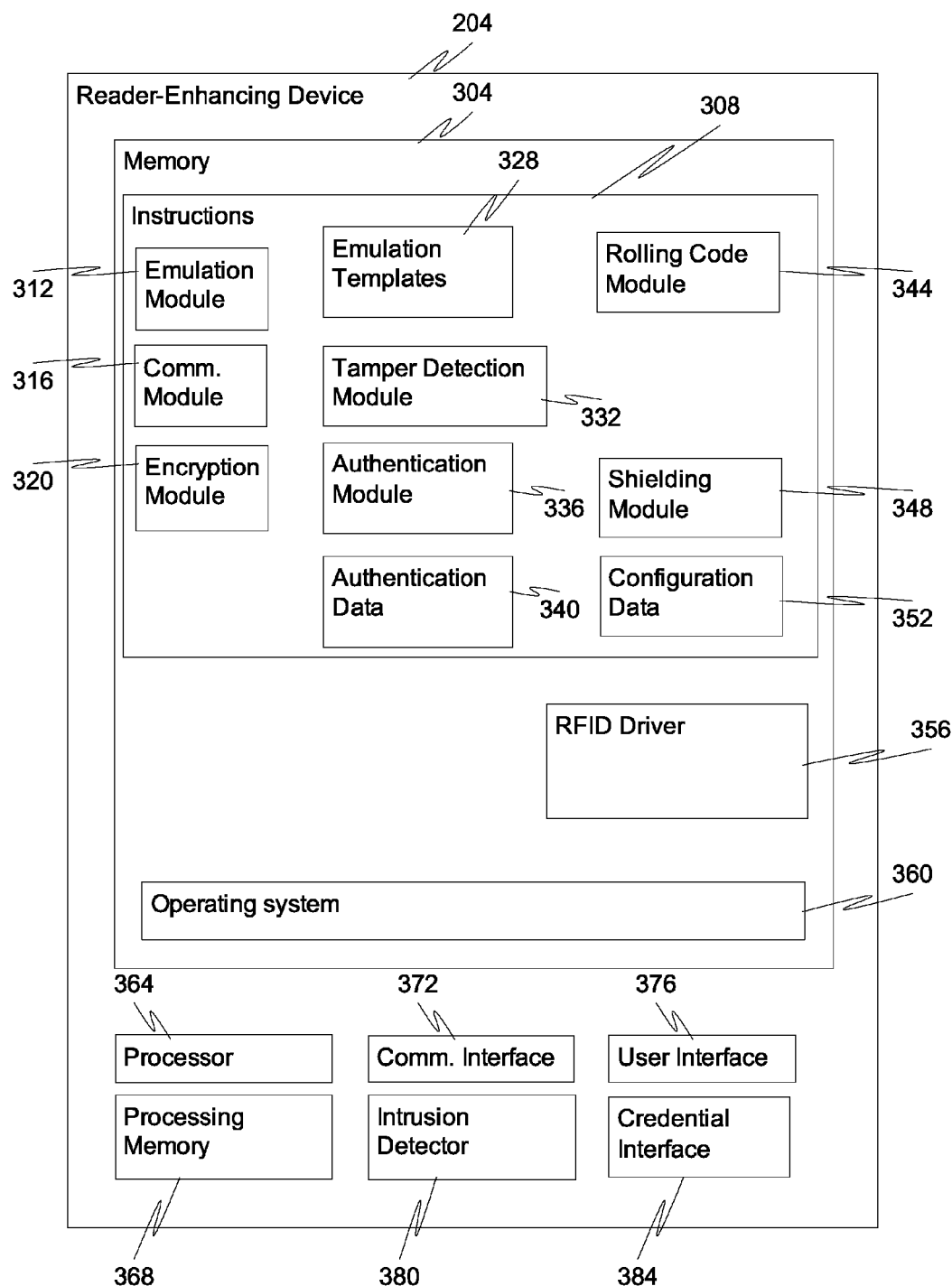
FIG. 3 is a block diagram depicting details of a reader-enhancing device in accordance with embodiments of the present disclosure.

With reference now to FIG. 3, additional details of a reader-enhancing device 204 will be described in accordance with embodiments of the present invention. The reader-enhancing device 204 may comprise memory 304 that includes a number of instructions 308, modules, and other data structures as well as a processor 364 for executing the instructions 308 and other contents of memory 304.

The reader-enhancing device 204 may also include a communication interface 372 which allows the reader-enhancing device 204 to communicate with a reader 104. Exemplary types of communication interfaces 372 include, without limitation, an RF antenna and driver, an infrared port, a fiber optics interface, a Universal Serial Bus (USB) port, or the like.

The reader-enhancing device 204 may further include a credential interface 384 which enables the reader-enhancing device 204 to communication with one, two, three, or more different types of credentials 112, 208. The credential interface 384 facilitates communications between the reader-enhancing device 204 credentials 112, 208. The type of credential interface 384 provided on the reader-enhancing device 204 may vary according to the type of credential 112, 208 that is in the system 100, 200. In some embodiments, the credential interface 384 includes one or more of an antenna, an array of antennas, an infrared port, an optical port, a magnetic stripe reader, a barcode reader or similar machine-vision components, a Near Field Communications (NFC) interface, or any other component or collection of components which enables the reader-enhancing device 204 to communicate with credentials 112, 208 and other portable memory devices. In some embodiments, the credential interface 384 enables the reader-enhancing device 204 to read one or more non-RFID machine-readable credentials including one or more of magnetic stripe cards, bar codes, Wiegand cards, Hollerith, infrared, Dallas 1-wire, and barium ferrite.

In some embodiments, the credential interface 384 and communication interface 372 are of the same type (i.e., RF communication interfaces). In some embodiments, the credential interface 384 and communication interface 372 are implemented as a single interface. Thus, the reader-enhancing device 204 may be enabled to communicate with credentials 112, 208 and readers 104 by using the same hardware components.

In addition to a communication interface 372, the reader-enhancing device 204 may include a user interface 376 which facilitates user interaction with the reader-enhancing device 204 as well as the reader 104 via the reader-enhancing device 204. The user interface 376 may include one or more user inputs, one or more user outputs, or a combination user input/output. Exemplary user inputs include, without limitation, keypads, buttons, switches, microphones, fingerprint scanners, retinal scanners, cameras, and the like. Exemplary user outputs include, without limitation, lights, display screens (projection, LCD, LED array, plasma, etc.), individual LED, speakers, buzzers, etc. Exemplary combination user input/outputs may include a touch-screen interface or any other type of interface which is capable of simultaneously displaying a user output and receiving a user input.

In addition to memory 304, the reader-enhancing device 204 may also include processing memory 368, which may be in the form of a Randomly Accessible Memory (RAM), cache memory, or any other type of memory used to facilitate efficient processing of instructions 208 by the processor 364.

Whereas the processing memory 368 is used to temporarily store data during processing tasks, the memory 304 is provided to store permanent instructions 308 which control the operational behavior of the reader-enhancing device 204. The memory 304 and/or 368 may be implemented using various types of electronic memory generally including at least one array of non-volatile memory cells (e.g., Erasable Programmable Read Only Memory (EPROM) cells or FLASH memory cells, etc.) The memory 304 and/or 368 may also include at least one array of dynamic random access memory (DRAM) cells. The content of the DRAM cells may be pre-programmed and write-protected thereafter, whereas other portions of the memory may selectively be modified or erased.

The various routines and modules which may be included in memory 304 comprise one or more of an emulation module 312, a communication module 316, an encryption module 320, emulation templates 328, a tamper detection module 332, an authentication module 336, authentication data 340, a rolling code module 344, a shielding module 348, and configuration data 352.

The tamper detection module 332 may comprise software and/or hardware that enables the reader-enhancing device 204 to detect potential attacks on the reader-enhancing device 204 and attempts to circumvent security features of the reader-enhancing device 204. In some embodiments, the tamper detection module 332 is enabled to determine that an invalid credential 112, 208 has been presented to the reader-enhancing device 204 or some other false user input has been provided to the reader-enhancing device 204. In response to detecting such an event, the reader-enhancing device 204 may increment a counter. If a predetermined number of these types of events are detected within a predetermined amount of time, then the reader-enhancing device 204 may implement one or more security measures to protect the reader-enhancing device 204 and data stored thereon. In particular, the reader-enhancing device 204 may temporarily slow down processing speeds, temporarily discontinue operations, sound an alarm, notify one or more security personnel, and the like.

As can be seen in FIG. 3, an intrusion detector 380 may also be provided in a physical form rather than or in addition to being provided as tamper-detection instructions 332 in memory 304. For example, a physical intrusion detector 380 may be provided that locks one or more user inputs, secures memory 304 such that it cannot be physically accessed without destroying some or all of the data stored thereon, detects a physical disconnection of the reader-enhancing device 204 and reader 104, detects an attempt to tamper with the physical connection of the reader-enhancing device 204 and reader 104, and the like.

In some embodiments, the intrusion detector 380 and/or tamper detection module 332 are configured to determine that an attack or potential attack on the reader-enhancing device 204 or reader 104 is under way and in response to making such a determination perform one or more counter-tamper actions: erasing keys and other sensitive data stored in memory 304, removing encryption keys from the reader-enhancing device 204, disabling the reader-enhancing device 204 and/or reader 104 from operating, and setting a flag in a non-volatile securely stored memory location.

The communication module 316 provides instructions which enable the reader-enhancing device 204 to communicate with other devices. In particular, the communication module 316 may comprise message encoding and/or decoding instructions, message encryption and/or decryption instructions, compression and/or decompression instructions, trans-coding instructions, and any other known type of instructions which facilitate communications over a communications network. For example, the communication module 316 may comprise instructions which enable the reader-enhancing device 204 to create one or more messages or communication packets which are appropriately formatted and transmitted in accordance with a known communication protocol via the communication interface 372. Likewise, the communication module 316 may also comprise instructions which enable the reader-enhancing device 204 to format messages received over the communication interface 372 for processing by various other components of the reader-enhancing device 204.

In addition to enabling the reader-enhancing device to communicate via communication interface 372, the communication module 316 may also be configured to enable the reader-enhancing device 204 to communicate with different types of credentials 112, 208 via the credential interface 384. Accordingly, the communication module 316 may be responsible for formatting commands that are transmitted to a credential 112, 208 as well as receiving messages from credentials 112, 208 and formatting them such that they can be processed by other routines in the instructions 308 or such that they can be forwarded on to the reader 104 in a format understood by the reader 104.

The communication module 316, in some embodiments, may be configured to work in conjunction with an encryption module 320. The encryption module 320 may comprise one or more encryption keys (public and/or private) as well as one or more encryption algorithms that can be used to secure communications between the reader-enhancing device 204 and other devices, such as a reader 104 and/or credential 112, 208. The encryption module 320 may be configured to always encrypt messages before they are transmitted by the reader-enhancing device 204 or the encryption module 320 may be configured to selectively encrypt certain messages having certain qualities. For example, the encryption module 320 may be configured to only encrypt emulated credential messages before they are sent to the reader 104 whereas other messages are sent without encryption.

The instructions 308 may further comprise an emulation module 312 that is configured to act as a credential emulator, which enables the reader 104 to communicate with types of credentials that it is not natively designed to communicate with. In particular, the emulation module 312 may be configured to emulate messages in a format consistent with the first type of credential 112 (i.e., the type of credential with which the reader 104 is natively capable of communicating with). The emulation module 312 may also be configured to generate credential data representing a first type of credential 112 that is recognized as valid by the reader 104 (or control panel 108). The emulation module 312 may generate such credential data by referencing the emulation templates 328 which comprise a list of possible valid credentials of the first type. When the emulation module 312 is invoked, the emulation module 312 may select one or more entries in the emulation templates 328 and generate a message that is transmitted from the reader-enhancing device 204 to the reader 104 in a format consistent with the first type of credential 112.

In some embodiments, the emulation templates 328 may be provided as a list (ordered or random) of credential data recognized as valid by the reader 104. As an additional security feature, the emulation module 312 may utilize a rolling code module 344 to assist in determining what credential data should be used from the emulation templates 328 in generating a message for transmission to the reader 104. In particular, the reader-enhancing device 204 may determine that it needs to emulate a first type of credential 112 for the reader 104 and in response to making such a determination, the emulation module 112 may invoke the rolling code module 344 to select credential data from the emulation templates 328. The selected credential data is then used by the emulation module 312 to generate one or more messages which simulate messages that are transmitted by the first type of credential 112.

In some embodiments, the rolling code module 344 may select credential data from the emulation templates 328 according to a predetermined selection pattern or with a predetermined selection algorithm. In some embodiments, the rolling code module 344 may alter the selection algorithm used after the reader-enhancing device 204 has been operating for a predetermined amount of time or after the reader-enhancing device 204 has received a prompting signal from the reader 104 indicating that a new selection algorithm should be utilized. Other operational features of the rolling code module 344 are discussed in U.S. Patent Application Nos. 2006/0464912 and 2010/0034375, both of which are incorporated herein by reference in their entirety.

Another module which may be provided in the instructions 308 is an authentication module 336 that is capable of receiving authentication data from a credential 112, 208, analyzing the authentication data, and determining if the received authentication data corresponds to valid authentication data. In some embodiments, the authentication module 336 may refer to authentication data 340 which is also stored in memory 304. In some embodiments, the authentication data 340 may comprise a list of valid or authorized credentials and their corresponding credential data. Alternatively, the authentication data 340 may comprise algorithms for analyzing authentication data and determining if such data is valid. In some embodiments, the initiation of the emulation module 312 may be contingent upon the authentication module 336 successfully determining that data received from a credential 112, 208 is valid credential data.

A shielding module 348 may also be provided as instructions 308 in memory 304. In particular, the shielding module 348 may be configured to block some or all communications between the reader 104 and credentials 112, 208. In some embodiments, the shielding module 348 actively determines if a first type of credential 112 is within proximity (i.e., read range) of the reader 104 and, if so, generates a scrambling signal or noise which precludes the reader 104 from reading the first type of credential 112. In some embodiments, the scrambling signal corrupts credential data as it is transmitted from the first type of credential 112 to the reader 104.

Configuration data 352 may also be maintained in memory 304. In some embodiments, the configuration data 352 describes operating characteristics of the reader 104 such as the reader's 104 frequency variation, operating frequency, power levels, polling rate, and timing characteristics. Other characteristics of the reader 104 include, without limitation, reader model number, firmware version, reader identifier, and other data which describes the reader 104. The characteristics of the reader 104 may be inherent characteristics or provisioned characteristics.

In some embodiments, the configuration data 352 may also comprise characteristics of the reader-enhancing device 204. For example, the configuration data 352 may describe capabilities of the reader-enhancing device 204, identification information of the reader-enhancing device 204, and the like. The configuration data 352 may also define data that is common to all credentials 112, 208 at a given location (e.g., by site code or company ID). If credentials are read by the reader-enhancing device 204 that do not present the common site code or company ID, then the reader-enhancing device 204 may reject messages received from such credentials or interfere with communications between such credentials and the reader 104. This ensures that the reader 104 is prevented from communicating with credentials 112, 208 that do not belong to a particular subset of credentials.

In some embodiments, a communications channel is established with the reader-enhancing device 204 via the communication interface 372 or credential interface 384. A control panel 108 or some other administrative device may be configured to communicate with the reader-enhancing device 204 via the communications channel to change one or more operating characteristics of the reader-enhancing device 204. The communications channel may utilize one or more of RF, light, and audio as a message-transmitting medium and messages may be exchanged via the communication channel using one or more of the following protocols Ultra-High Frequency (UHF), Bluetooth, WiFi, Zigbee, and infrared light.

In accordance with at least some embodiments of the present disclosure, the tamper detection module 332 may be configured to "memorize" the characteristics of the reader 104 with which the reader-enhancing device 204 is configured to operate with. In the event that the tamper detection module 332 detects that the reader-enhancing device 204 is trying to operate in connection with a reader 104 that does not possess the memorized characteristics, the tamper detection module 332 may determine that the reader-enhancing device 204 has been improperly removed from the reader 104 and may limit operating capabilities of the reader-enhancing device 204 or, in some embodiments, disable the reader-enhancing device 204.

Other components of memory 204 may include a Personal Computer/Smart Card (PC/SC) (not depicted), an RFID driver 356, and an operating system 360, which is a high-level application that facilitates interactions between various other modules and applications in memory 204 and hardware components of the reader-enhancing device 204. The PC/SC and RFID driver 356 may be responsible for facilitating credential 112, 208 integration into the computing environment of the reader-enhancing device 204. In some embodiments, the first type of credential 112 and reader-enhancing device 204 utilize a first set of communication protocols to communicate with one another. Similarly, the second type of credential 208 and reader-enhancing device 204 may utilize a second set of communication protocols, different from the first set of communication protocols, to communicate with one another. All other communications and processing components of the reader-enhancing device 204 are carried out in another protocol that is different than the first and second communication protocols. The PC/SC in combination with the RFID driver 356 may facilitate interactions between the reader-enhancing device 204 and credentials 112, 208 and integrate messages received from a credential 112, 208 or any other type of user input into the appropriate format such that they can be handled by the various modules stored as instructions 308. The RFID driver 356 may also include commands for controlling operations of the credential interface 384 and/or communication interface 372.

The processor 304 may include any general-purpose programmable processor, digital signal processor (DSP) or controller for executing application programming. Alternatively, the various modules described herein may be implemented as hardware or firmware rather than software and the processor 304 may comprise a specially configured Application Specific Integrated Circuit (ASIC).

Figure 4:
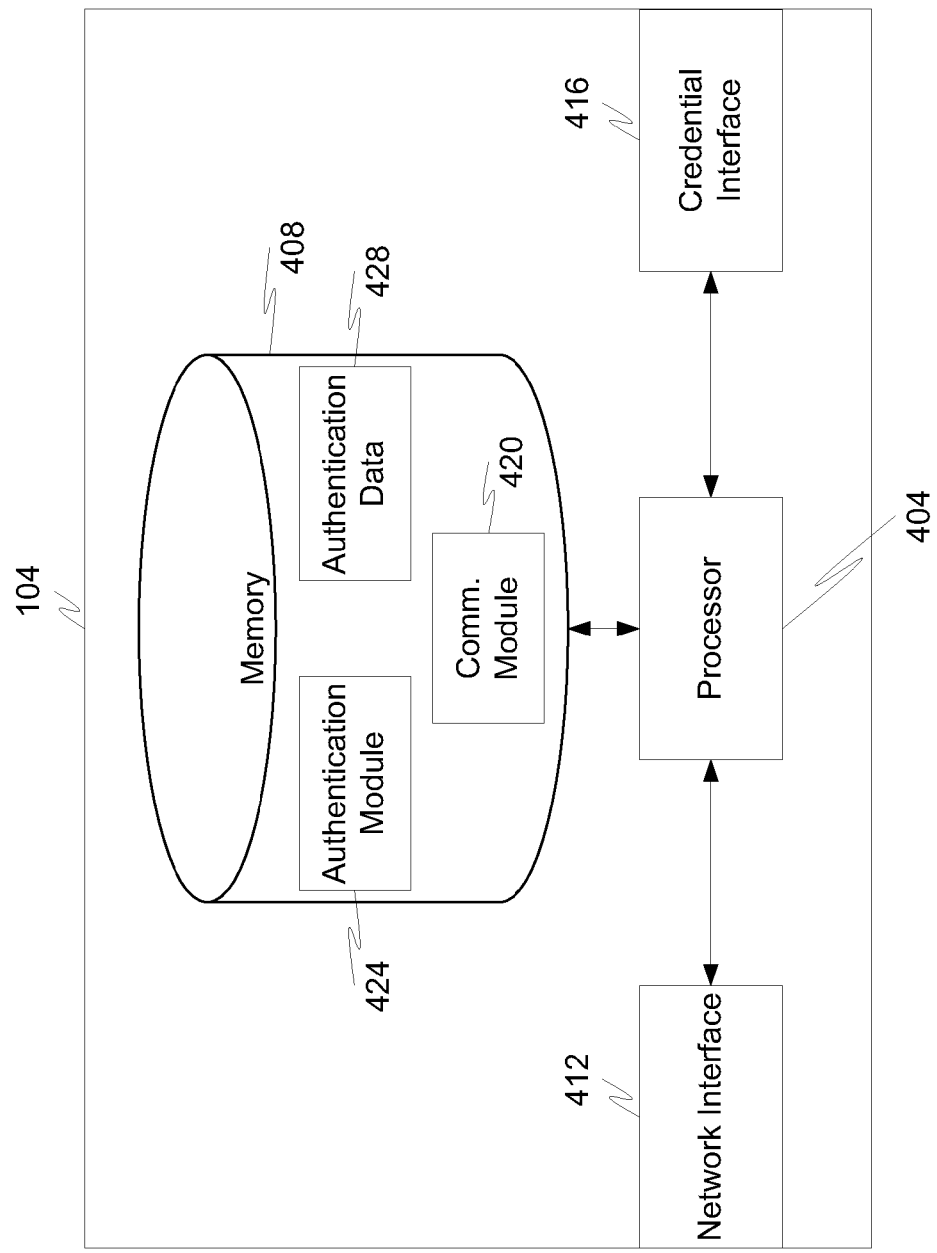
FIG. 4 is a block diagram depicting details of a reader in accordance with embodiments of the present disclosure.

With reference now to FIG. 4, additional details of a reader 104 will be described in accordance with at least some embodiments of the present disclosure. The reader 104 may be a conventional type of reader or a low-power reader such as those described in U.S. Pat. No. 7,782,209 to Lowe et al., the entire contents of which are hereby incorporated herein by reference.

In some embodiments, the reader 104 may comprise a processor 404, memory 408, a network interface 412, and a credential interface 416. The processor 404 may be similar or identical to the processor 304 of the reader-enhancing device 204, meaning that the processor 404 may have the same general processing capabilities as the processor 304.

Similarly, the memory 408 may be similar or identical to the memory 304, 368 provided on the reader-enhancing device 204. For example, the memory 408 may be volatile or non-volatile. Examples of non-volatile memory include, but are not limited to, Read Only Memory (ROM), Erasable Programmable ROM (EPROM), Electronically Erasable PROM (EEPROM), Flash memory, and the like. Examples of volatile memory include Random Access Memory (RAM), Dynamic RAM (DRAM), Static RAM (SRAM), or buffer memory. In one embodiment, the memory 408 and the processor 404 are designed to utilize known security features to prevent unauthorized access to the contents of the memory 408 such as side channel analysis and the like.

The memory 408 may contain one or more modules which enable the functionality of the reader 104. In particular, the reader 104 may comprise a communication module 420, an authentication module 424, and authentication data 428. The communication module 420 enables the reader 104 to communicate with the first type of credentials 112 as well as communicate with the control panel 108. In some embodiments, separate communication modules may be provided where one communication module supports reader-to-credential communications and another communication module supports reader-to-control panel communications.

In some embodiments, the communication module 420 is natively configured to enable the reader 104 to communicate only with a first type of credential 112 or receive a particular type of user input. Accordingly, the communication module 420 limits the functionality of the reader 104 as a stand-alone device.

Likewise, the authentication module 424 is configured to analyze credential data from the first type of credential 112. In some embodiments, the authentication module 424 is configured to analyze credential data from the first type of credential 112 by comparing credential data received at the credential interface 416 with the authentication data 428. In some embodiments, data in the authentication data 428 matches data in the emulation templates 328. Accordingly, the emulation templates 328 may be used to generate credential data for the reader 104 that is already known to correspond to a valid input when analyzed by the authentication module 424.

The network interface 412 enables the reader 104 to communicate with networked devices, such as control panel 108. Exemplary types of network interfaces 412 include, without limitation, Ethernet ports, antennas, Universal Serial Bus (USB) ports, serial data ports, parallel data ports, Small Computer Systems Interface (SCSI) ports, interfaces supporting cellular communications via known cellular communication protocols, and the like.

The credential interface 416 is designed to enable the reader 104 to communicate with credentials 112. As one example, the credential interface 416 may comprise one or more antennas and antenna drivers which enable the reader 104 to exchange messages wirelessly with the first type of credential 112. In some embodiments, the reader-enhancing device 204 is configured to communicate with the reader 104 via the credential interface 416. This feature is accomplished by virtue of the fact that the reader-enhancing device 204 comprises an emulation module 312 which is configured to emulate credentials of the first type 112 (i.e., generate and transmit messages to the reader 104 in the same format and according to the same protocols that the first type of credential 112 would use to communicate with the reader 104). Accordingly, the credential interface 416 may enable the reader 104 to communicate with one or both of the first type of credential 112 and the reader-enhancing device 204.

Although not depicted, the reader 104 may also include a user interface that is similar to the user interface 376. Such a user interface may support user interaction with the reader 104.

Figure 5:
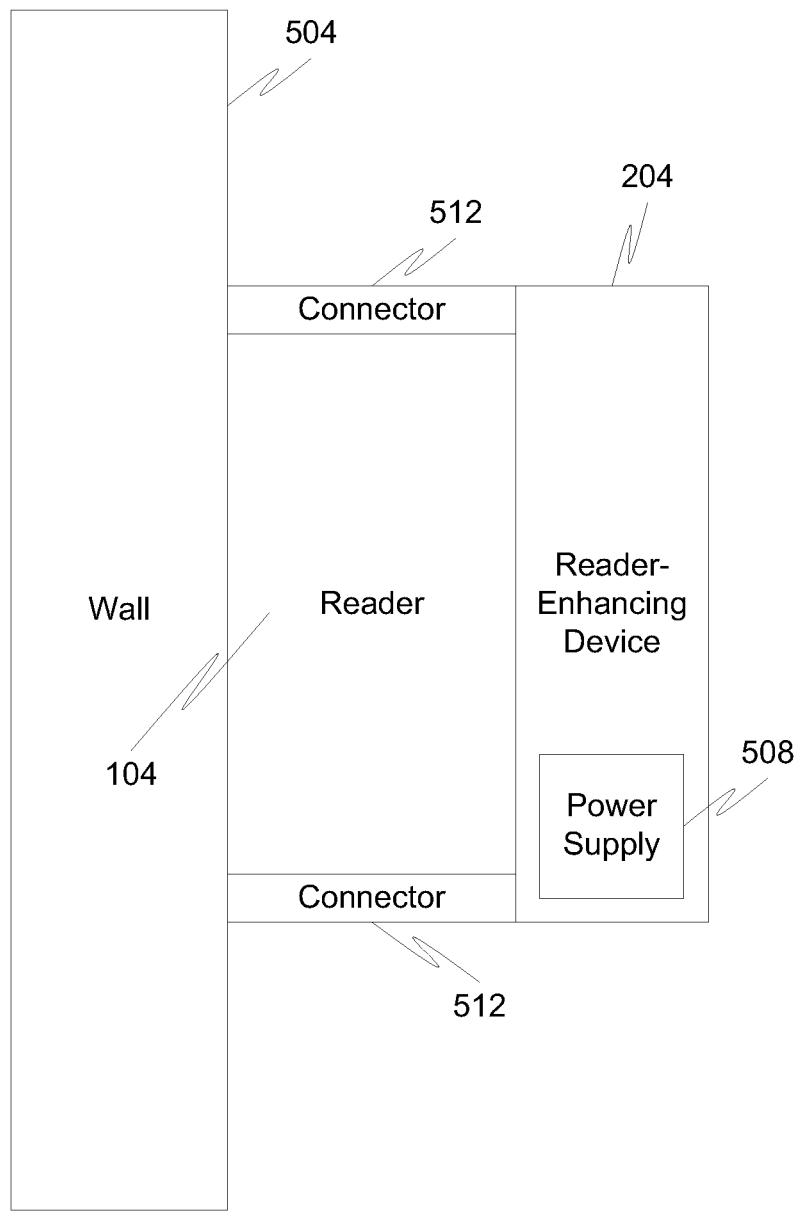
FIG. 5 is a block diagram depicting a first configuration of a reader-enhancing device in accordance with embodiments of the present disclosure.

With reference now to FIG. 5, a first exemplary physical configuration of the reader 104 and reader-enhancing device 204 will be described. The reader 104, in one embodiment, may be mounted to a wall 504 via one or more mounting mechanisms (e.g., screws, nails, hangers, fasteners, adhesives, or the like). Although it is not necessary to mount the reader 104 to a wall 504, but instead mount the reader 104 to some other stationary or mobile asset. Accordingly, although discussions of the physical configurations will generally refer to a reader 104 mounted on a wall 504, embodiments of the present disclosure are not so limited.

In the first exemplary physical configuration, the reader-enhancing device 204 may be mounted to the reader 104 as a reader face-plate. In other words, the reader-enhancing device 204 may be dimensioned such that the silhouette of the reader-enhancing device 204 matches or substantially matches the silhouette of the reader 104. In some embodiments, the reader-enhancing device 204 may be configured to replace an original face-plate of the reader 204.

In embodiments where the reader-enhancing device 204 is configured as a face-plate or variant thereof, the reader enhancing device 204 may be connected to one or both of the reader 104 and wall 504 via connectors 512. The connectors 512 may correspond to one or more physical components which connect the reader-enhancing device 204 to the reader 104 or wall 504. In some embodiments, the connectors 512 connect to mounting holes provided on the reader 104. The connectors 512 may be integral parts of the reader-enhancing device 204 that latch, hook, screw, or otherwise mate with a portion of the reader 104. In other embodiments, the connectors 512 may be separate components that latch, hook, screw or otherwise mate with a portion of the reader-enhancing device 204 and reader 104.

As can be seen in FIG. 5, the reader-enhancing device 508 may be provided with its own power supply 508. In some embodiments, the power supply 508 may correspond to a battery or set of batteries, a capacitor or set of capacitors, a super-capacitor or set of super-capacitors, a solar cell or array of solar cells, an antenna or set of antennas (for converting energy from an RF field generated by the reader 104 into the power supply for the reader-enhancing device 204), and/or a power adaptor or converter for receiving and converting an external power supply from either an external power outlet or from the reader 104.

In some embodiments, the power supply 508 corresponds to an antenna that is tuned to have an impedance that matches an impedance of the credential interface 416. Therefore, when an RF field is generated by the credential interface 416, the power supply 508 is capable of converting at least some energy from the RF field into energy that is used to power the components of the reader-enhancing device 204. In some embodiments, however, it may be desirable to supplement the power supply 508 to enable the reader-enhancing device 204 to operate during periods in which the reader 104 is not generating an RF field. Accordingly, the power supply 508 may comprise a collection of the potential power supplies discussed above. Moreover, it may be possible to provide a capacitor or super-capacitor that is charged by an RF field generated by the reader 104, thereby enabling the reader-enhancing device 204 to begin operating when a RF field is initially generated by the reader 104 and continue operating after the reader 104 has stopped generated by the RF field.

Figure 6:
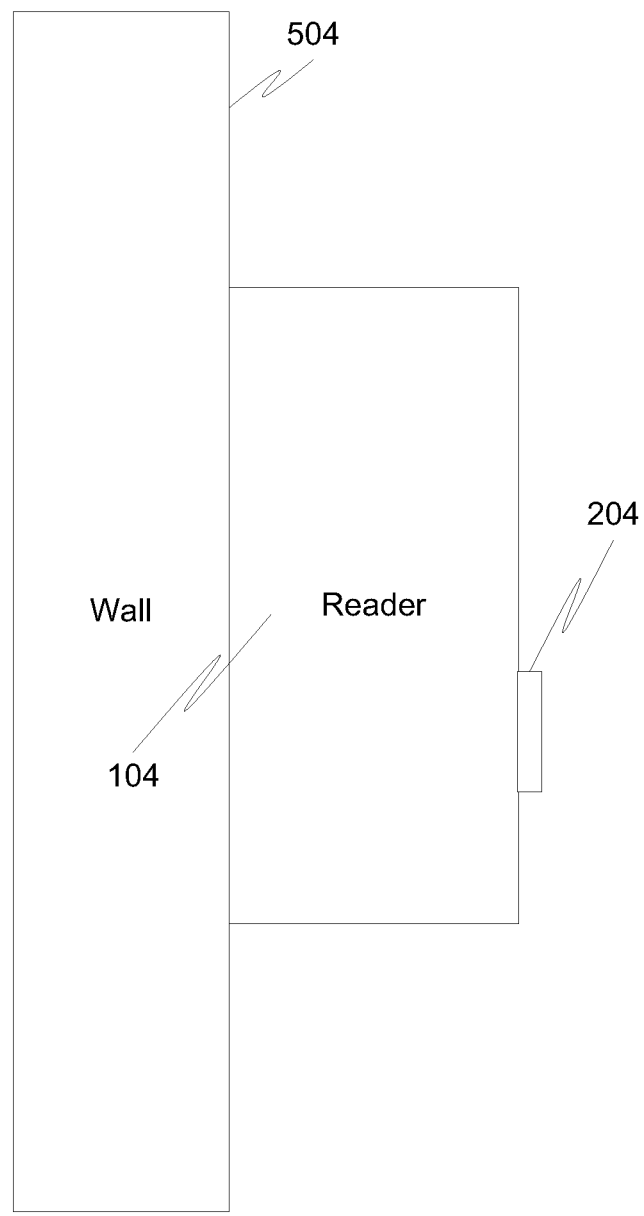
FIG. 6 is a block diagram depicting a second configuration of a reader-enhancing device in accordance with embodiments of the present disclosure.

With reference now to FIG. 6, a second exemplary physical configuration of the reader 104 and reader-enhancing device 204 will be described. In this particular configuration, the reader-enhancing device 204 has a surface area that is significantly smaller than the surface area of the reader's 104 face-plate. In such a configuration, the reader-enhancing device 204 may be affixed to the front, side, bottom, or top of the reader 104. As one example, the reader-enhancing device 204 may correspond to a sticker that connects to the reader 104 with an adhesive. Although the reader-enhancing device 204 depicted in FIG. 6 is significantly smaller than the reader-enhancing device 204 depicted in FIG. 5, one skilled in the art will appreciate that either reader-enhancing device 204 may comprise some or all of the components discussed in connection with FIG. 4.

Figure 7:
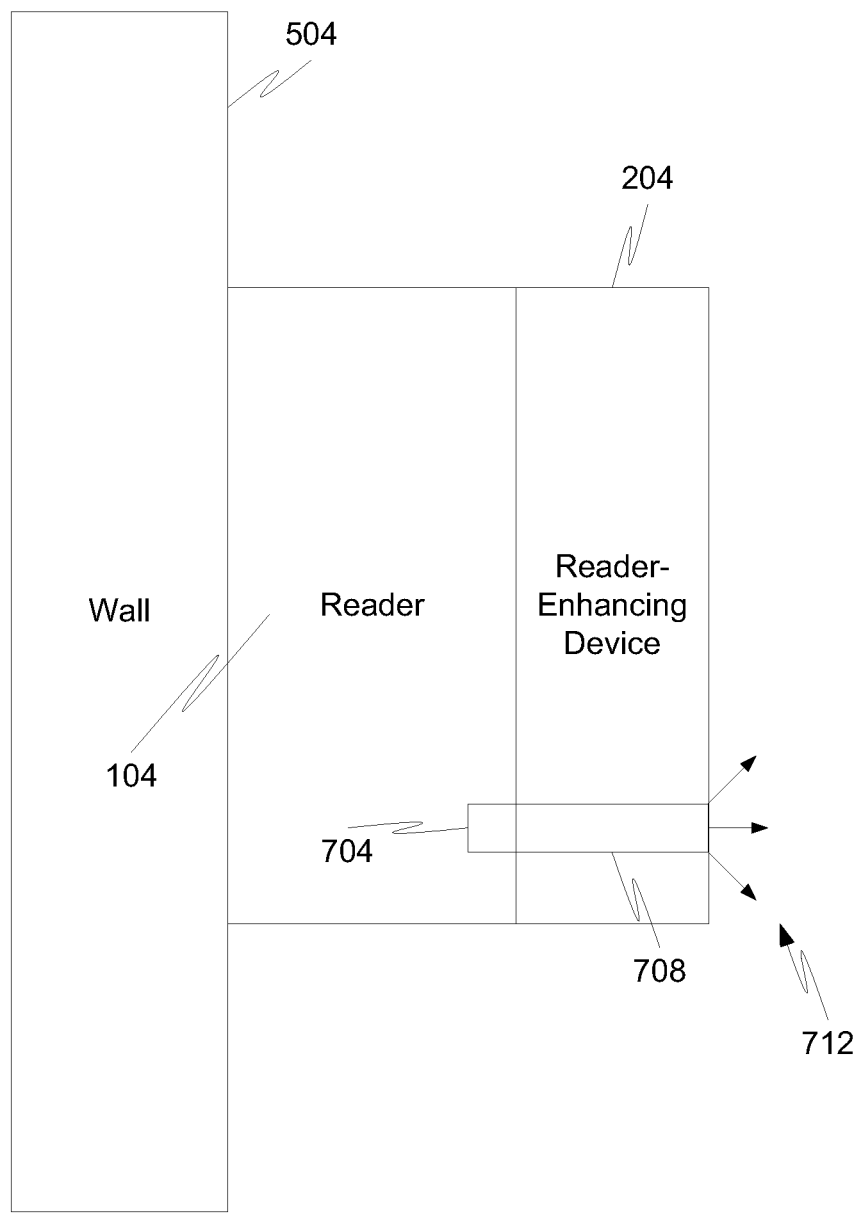
FIG. 7 is a block diagram depicting a third configuration of a reader-enhancing device in accordance with embodiments of the present disclosure.

With reference now to FIG. 7, a third exemplary physical configuration of the reader 104 and reader-enhancing device 204 will be described. This configuration depicts the scenario where the reader-enhancing device 204 covers at least a portion of the reader's 104 user interface 704. As one example, the reader's 104 user interface 704 may correspond to an LED, collection of LEDs, buzzer, speaker, or the like and may be similar or identical to user interface 376. The reader-enhancing device 204 is provided with a user interface via 708 which enables a user to interact with the user interface 704 of the reader 104. In some embodiments, the user interface via 708 comprises a void or hole in the reader-enhancing device 204 which enables unobstructed physical access to the user interface 704. In some embodiments, the user interface via 708 comprises fibers or similar optical components (e.g., lenses, mirrors, reflective coatings in the inner surface of the via 708, etc.) which carry light generated by the user interface 704 to the outer surface of the reader-enhancing device 204.

In some embodiments, the via 708 is not actually a hole or void but instead comprises a photo detector or microphone and an LED or buzzer. The photo detector or microphone may be provided on the surface of the reader-enhancing device 204 which is proximate to the reader 104. The LED or buzzer may be provided on the opposite surface of the reader-enhancing device 204 which faces away from the reader 104. The photo detector or microphone may be connected to the LED or buzzer thereby enabling the via 708 to transfer outputs of the user interface 704 to the exposed surface of the reader-enhancing device 204.

Although the user interface 704 has been primarily described as a user output, one skilled in the art will appreciate that the user interface 704 may also comprise a user input and the configuration of the via 708 may be designed to accommodate the type of user input on the reader 104.

Figure 8:
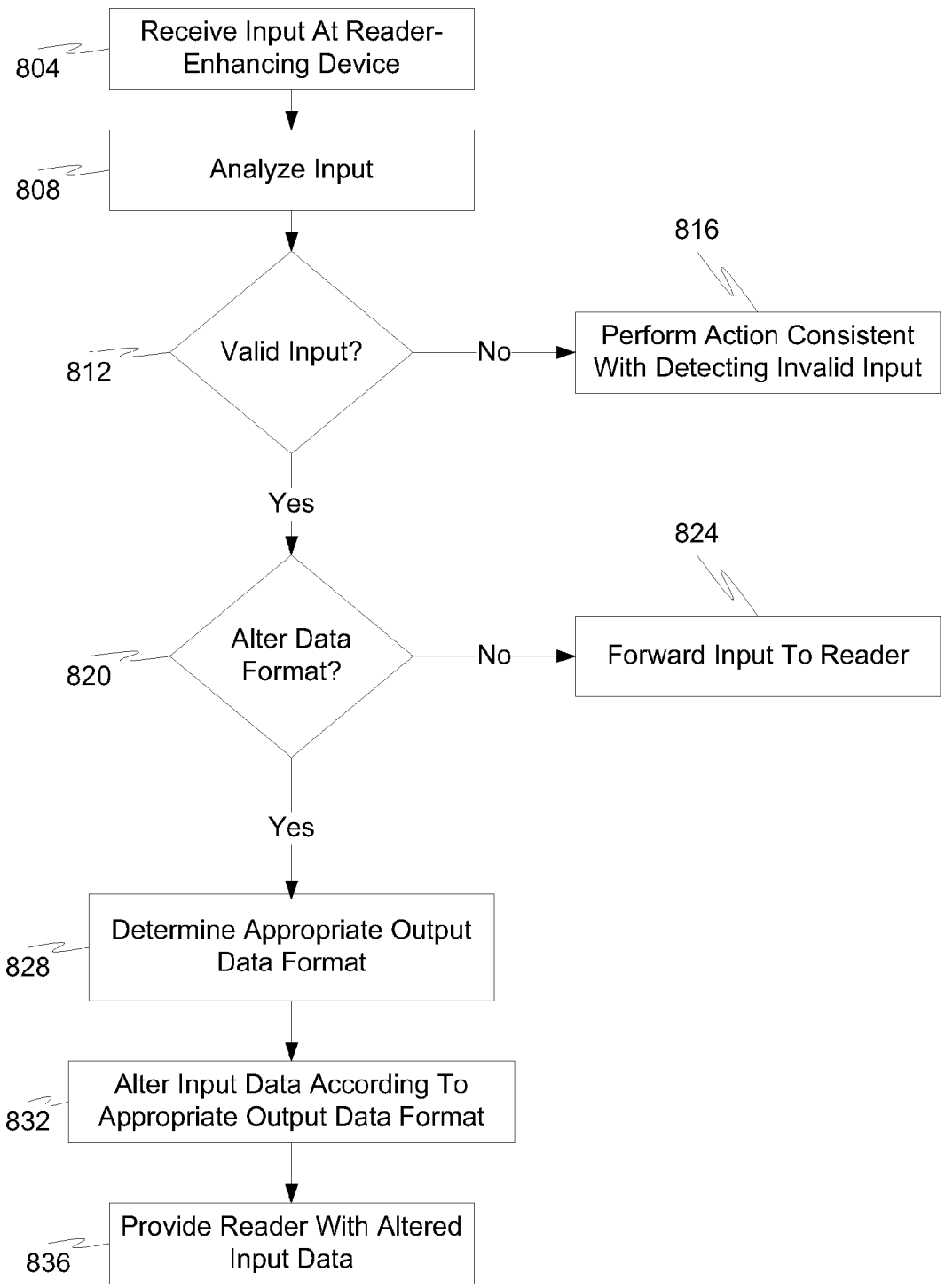
FIG. 8 is a flow diagram depicting a first access control method in accordance with embodiments of the present disclosure.

With reference now to FIG. 8, a first access control method will be described in accordance with at least some embodiments of the present invention. The method is initiated when input is received at the reader-enhancing device 204 (step 804). The input received at the reader-enhancing device 204 may correspond to one or more of a credential input, a user-provided input, a biometric input, combinations thereof, or the like. The input, if received as a credential input, may be received from a first type of credential 112, a second type of credential 208, or any other type of credential. In some embodiments, the input received at the reader-enhancing device 204 does not necessarily have to be natively supported by the reader 104. Exemplary inputs which may be received in this step include a credential input transmitted at 125 kHz, a credential input transmitted at 13.56 MHz, a credential input transmitted at some other carrier frequency, a credential input transmitted via infrared light, a credential input received with machine vision, a credential input transmitted via a contact-based medium (e.g., magnetic stripe, Wiegand card, etc.), or the like.

Upon receiving the input, the reader-enhancing device 204 invokes the authentication module 336 to analyze the input (step 808) and determine if the received input corresponds to a valid input (step 812). In this step, the authentication module 336 may compare the received input with one or more valid credential entries in the authentication data 340 to determine if the received input corresponds to a valid input. Rather than actually analyzing the content of the received input, the authentication module 336 may simply analyze the format and other characteristics of the received input and compare the format and characteristics with expected or acceptable formats or characteristics. If the received input has an expected format and/or characteristics, then the received input may be deemed valid. If the received input is not in an expected format or does not have expected characteristics (e.g., the received input has one or more of an unexpected carrier frequency, unexpected message format, unexpected protocol, unexpected data format, unexpected data field, etc.), then the received input may be determined to be invalid.

If the received input is determined to be invalid, then the method proceeds with the reader-enhancing device 204 performing one or more actions consistent with detecting an invalid input (step 816). As one example, the reader-enhancing device 204 may take no action. As another example, the reader-enhancing device 204 may invoke the tamper detection module 332 to implement one or more actions responsive to detecting a potential attack on the reader 104 or reader-enhancing device 204. For instance, the tamper detection module 332 may delay the responsiveness of the reader-enhancing device 204, temporarily disable the reader-enhancing device 204, temporarily disable the reader 104, begin generating a jamming signal, erase sensitive data such as encryption keys, emulation templates 328, configuration data 352, authentication data 340, etc. from memory 304, set a flag in a non-volatile securely-stored memory location of the reader-enhancing device 204 which causes the reader-enhancing device 204 to become inoperable, and the like.

If, however, the authentication module 336 determines that the received input is valid, then the method continues with the communication module 316 determining if the received input needs to be reformatted such that it can be transmitted to the reader 104 (step 820). Specifically, if the reader 104 is only capable of reading 125 kHz credentials and the input was received from a 13.56 MHz credential, then the reader-enhancing device 204 may need to alter the data format to comply with the limitations of the reader 104. Conversely, if the received input was a user-provided input (e.g., PIN, password, biometric data, etc.), and the reader 104 is only configured to handle credential inputs, then the user-provided input may be reformatted as a credential input. If the query of step 820 is answered negatively (i.e., the received input is natively readable by the reader 104), then the received input is simply forwarded to the reader 104 in its original format (step 824).

If, on the other hand, the received input cannot be natively processed by the reader 104, then the emulation module 312 and/or communication module 316 may be invoked to determine an appropriate output data format that is compliant with the limitations of the reader 104 (step 828). Such a determination may be made by analyzing the configuration data 352 to determine the operating characteristics of the reader 104.

Once the appropriate output data format is determined, the method continues with the communication module 316 and/or emulation module 312 altering the received input data into the appropriate format (step 832) and providing the altered data to the reader 104 (step 836). This particular access control method enables a reader-enhancing device 204 to act as a conduit between a credential 112, 208 and the reader 104 for inputs that are natively supported by the reader 104 as well as a translator for inputs that are not natively supported by the reader 104.

Figure 9:
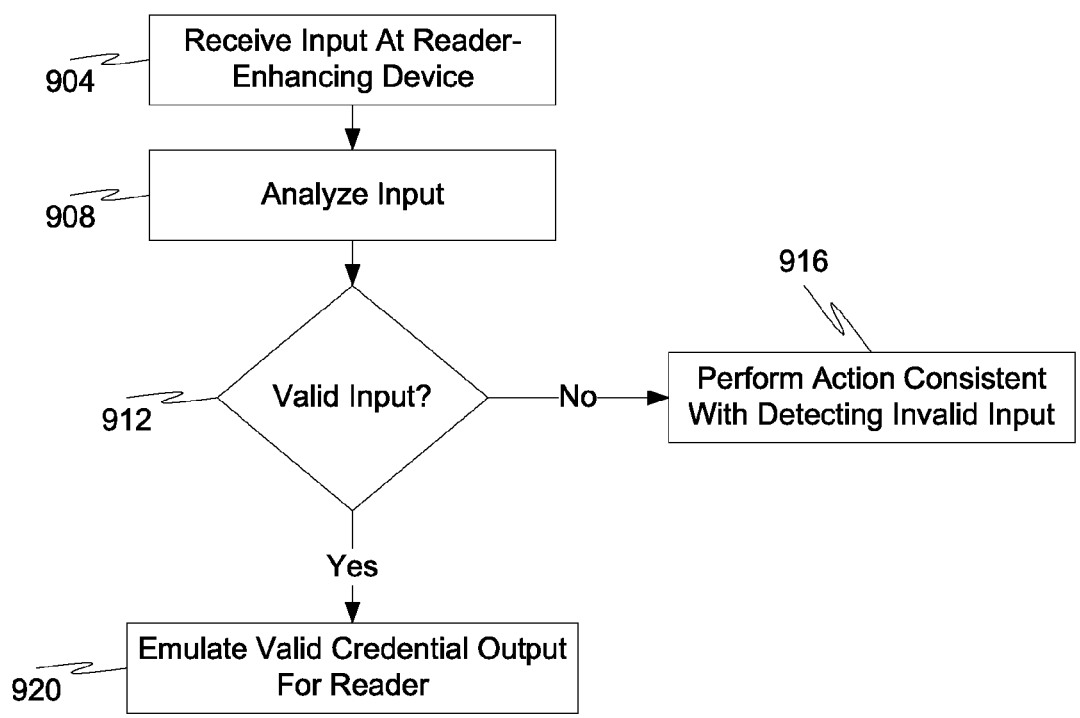
FIG. 9 is a flow diagram depicting a second access control method in accordance with embodiments of the present disclosure.

With reference now to FIG. 9, details of a second access control method will be described in accordance with embodiments of the present disclosure. Similar to the first access control method, the second access control method is initiated when input is received at the reader-enhancing device 204 (step 904). The method continues by invoking the authentication module 336 to analyze the received input (step 908) and determine if the received input corresponds to a valid input (step 912). In some embodiments, the authentication module 336 analyzes the data contained in the received input. In some embodiments, the authentication module 336 analyzes characteristics of the received input. In some embodiments, the authentication module 336 analyzes the format of the received input.

If the received input is determined to be invalid, the reader-enhancing device 204 performs one or more actions consistent with detecting an invalid input (step 916). If, however, the received input is determined to be valid, the emulation module 312 is invoked to emulate a valid credential output that can be read and processed by the reader 104 (step 920). In some embodiments, the received input may correspond to a valid 13.56 MHz credential input and the emulation module 312 may emulate a valid 125 kHz credential input for the reader 104 by determining a valid credential input from the emulation templates 328 and formatting the valid credential input for transmission via a 125 kHz carrier frequency. In some embodiments, the received input may correspond to a valid 125 kHz credential input and the emulation module 312 may emulate a valid 13.56 MHz credential input for the reader 104 by determining a valid credential input from the emulation templates 328 and formatting the valid credential input for transmission via the 13.56 MHz carrier frequency. In some embodiments, the received input may correspond to a valid user-provided input and the emulation module 312 may emulate a valid credential input in a format that can be processed by the communication module 420 of the reader 104.

In this particular access control method, it is not necessary that the data received at the reader-enhancing device 204 be the same data provided to the reader 104. For example, the data received at the reader-enhancing device 204 may correspond to first credential data (e.g., a first site code, a first card ID, a first user ID, a first manufacturer ID, a first key, etc.). If the data received at the reader-enhancing device 204 is determined to be valid by, for example, comparing the data with the authentication data 340, then the emulation module 312 may generate a message for the reader 104 that contains valid second credential data (e.g., a second site code, a second card ID, a second user ID, a second manufacturer ID, a second key, etc.). The valid second credential data may be generated by retrieving a known valid credential input from the emulation templates 328.

This particular access control method differs from the first access control method because rather than altering data received at the reader-enhancing device 204, the emulation module 312 generates a credential input that is known, before its transmission, to be evaluated as valid by the reader 104 rather than simply translating or passing on inputs received from a credential.

Figure 10:
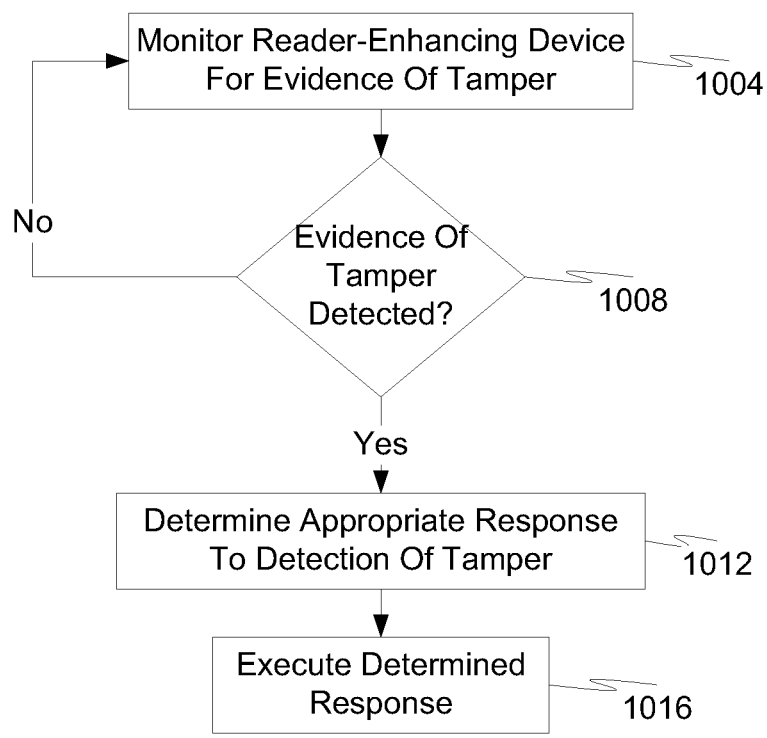
FIG. 10 is a flow diagram depicting a tamper detection method in accordance with embodiments of the present disclosure.

With reference now to FIG. 10, an exemplary tamper detection method will be described in accordance with at least some embodiments of the present disclosure. The tamper detection method is initiated when the reader-enhancing device begins monitoring for evidence of tamper (step 1004). In some embodiments, the tamper detection module 332 is configured to periodically monitor the status of certain operating parameters of the reader-enhancing device 204 as well as the status any intrusion detectors 380. In some embodiments, the tamper detection module 332 is configured to continuously monitor operating parameters of the reader-enhancing device 204 and/or the status of the intrusion detector 380. The tamper detection module 332 may also analyze the behavior of the authentication module 336 to determine if any invalid inputs have been received, whether more than a predetermined number of invalid inputs have been received within a predetermined amount of time, and/or whether certain types of invalid inputs have been received.

Depending upon the results of the monitoring step, the tamper detection module 332 determines if evidence of tamper has been detected (step 1008). If not, the method returns to step 1004. If so, the method proceeds with the tamper detection module 332 determining one or more appropriate responses to the detection of tamper (step 1012) and executed such responses (step 1016).

In some embodiments, if evidence of tamper is detected, then the tamper detection module 332 may erase sensitive data including keys from memory 304 of the reader-enhancing device 204. Moreover, a command may be transmitted to the reader 104 causing the reader 104 to erase any such sensitive data from its memory 408.

Alternatively, or in addition, the reader-enhancing device 204 and/or reader 104 are disabled either temporarily (e.g., for a predetermined amount of time or until authorized personnel reboots the device) or permanently.

Alternatively, or in addition, the tamper detection module 332 sets a flag in a predetermined location of memory 304 which causes the reader-enhancing device 204 to become inoperable.

Alternatively, or in addition, the tamper detection module 332 may invoke the shielding module 348 to prevent the reader from reading credential input.

Alternatively, or in addition, a buzzer, alarm, or the like may be engaged to notify security personnel that tamper has been detected. Similarly, the tamper detection module 332 may generate one or more messages (e.g., email, Short Message Service (SMS), Multimedia Message Service (MMS), etc.) which are transmitted to communication devices associated with security personnel.

Figure 11:
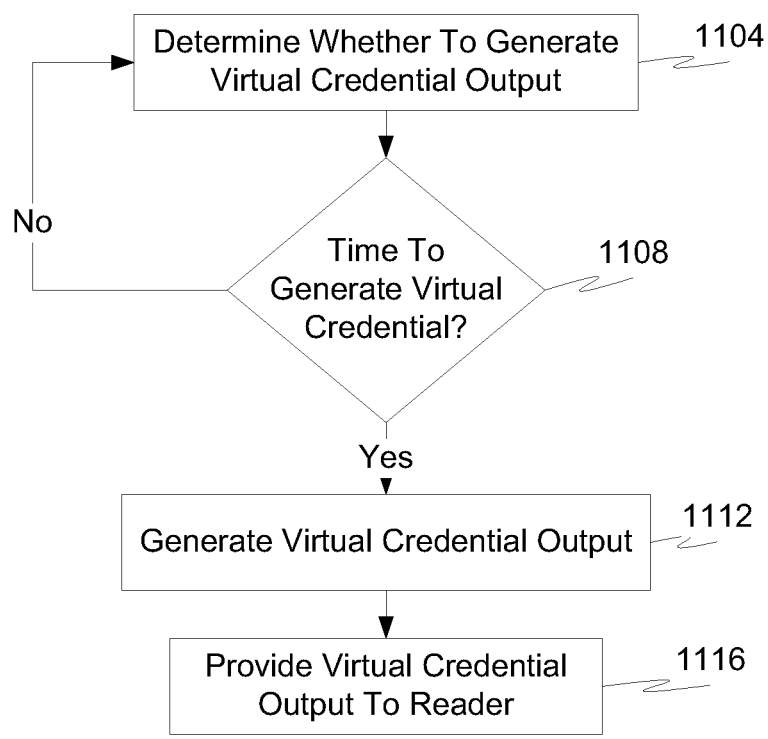
FIG. 11 is a flow diagram depicting a virtual credential generation method in accordance with embodiments of the present disclosure.

Referring now to FIG. 11, an exemplary virtual credential generation method will be described in accordance with embodiments of the present disclosure. The method begins when the emulation module 312 determines whether to generate a virtual credential output (steps 1104 and 1108).

In some embodiments, the reader-enhancing device 204 is configured to generate a virtual credential output without having read a credential or received any other type of input. Rather, the reader-enhancing device 204 is configured to generate a virtual credential output randomly, periodically, or semi-periodically, regardless of whether or not an external input has been received at the reader-enhancing device. Generation of a virtual credential output on a random, periodic, or semi-periodic basis helps increase the security of the reader-enhancing device 204 and reader 104 and further ensure that the connection between the two devices has not been tampered with.

In some embodiments, the reader-enhancing device 204 is configured to generate a virtual credential output when the tamper detection module 332 detects evidence of tamper. A virtual credential generated in response to such an occurrence may have a predetermined set of credential data that, when analyzed by the reader 104, allows the reader 104 to determine that evidence of tamper has been detected. This enables the reader-enhancing device 204 to report evidence of tamper to the reader 104 via a virtual credential output. Accordingly, the reader 104 does not have to be modified to support a different communication protocol with the reader-enhancing device 204. Instead, the reader-enhancing device 204 is configured to communicate with the reader 104 in a format understood by the reader 104.

If the query of step 1108 is answered negatively, the method remains in the loop of steps 1104 and 1108. If it is determined that it is time to generate a virtual credential output, then the emulation module 312 refers to the emulation templates 328 and generates a virtual credential output with the data contained in one or more fields of the emulation templates 328 (step 1112). The generated virtual credential output is then transmitted to the reader 104 via the credential interface 384 where it is received at the reader's 104 credential interface 416.

In some embodiments it may be desirable to encrypt or obfuscate the virtual credential output before it is transmitted to the reader 104. In such embodiments, the encryption module 320 may be invoked to encrypt the virtual credential output generated by the emulation module 312 with an encryption key or obfuscate the virtual credential output according to a predetermined obfuscation algorithm before the virtual credential output is provided to the reader 104.

In some embodiments, the virtual credential output may contain instructions which cause the reader 104 to alter its configurations. In particular, the virtual credential output may contain configuration data which reprograms one or more operating characteristics of the reader 104 to, hopefully, counteract possible attacks on the reader 104. As one example, the virtual credential output may comprise configuration data which causes the reader 104 to alter its behavior such that it only readers credentials of a certain type and does not respond to any other type of input. By providing the reader-enhancing device 204 with these capabilities the reader 104 can be upgraded without replacing or upgrading any components of the reader 104 itself.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
providing a reader-enhancing device within a read range of a reader, wherein the reader is natively configured to read a first type of credential;
configuring the reader-enhancing device such that an output of the reader enhancing device emulates the first type of credential so as to enable communications between the reader-enhancing device and the reader;
receiving input at the reader-enhancing device, the input received at the reader-enhancing device being different than an input received from the first type of credential; and
in response to receiving the input at the reader-enhancing device, generating, at the reader-enhancing device, an output which emulates the first type of credential thereby enabling the reader to respond to the input received at the reader-enhancing device, wherein the reader is not configured to read the input received at the reader-enhancing device.

2. The method of claim 1, wherein the first type of credential comprises a 125 kHz credential and wherein the input received at the reader-enhancing device comprises one or more of credential input from a 13.56 MHz credential and user-provided input.

3. The method of claim 1, wherein the reader-enhancing device comprises a power source that at least partially utilizes energy from an RF field generated by the reader.

4. The method of claim 3, wherein the power source further comprises one or more of a batter, a capacitor, a super-capacitor, and a solar cell.

5. The method of claim 1, wherein the reader-enhancing device is configured to memorize characteristics of the reader including one or more of the reader's frequency variation, power levels, polling rate, and timing so that the reader-enhancing device is configured to interface only with the reader having the memorized characteristics.

6. The method of claim 1, further comprising:
operating the reader-enhancing device during a period of time when the reader is not generating an RF field.

7. The method of claim 1, further comprising:
generating a virtual credential output at the reader-enhancing device; and
providing the virtual credential output to the reader, wherein the virtual credential output is provided in a format identical to a format used by the first type of credential.

8. The method of claim 7, wherein the virtual credential output is generated in the absence of the reader-enhancing device receiving an external input.

9. The method of claim 7, wherein the virtual credential output is generated in response to the reader-enhancing device detecting evidence of tamper with one or both of the reader and reader-enhancing device.

10. The method of claim 9, wherein the virtual credential output contains configuration data which, when received by the reader, reprograms at least one characteristic of the reader includes one or more of the following: frequency variation, operating frequency, power levels, polling rate, timing characteristics, reader model number, firmware version, reader identifier, and data which describes the reader.

11. The method of claim 7, wherein the virtual credential output contains one or more of cryptographic data, encryption keys, and random number seeds.

12. The method of claim 1, further comprising:
changing one or more operating characteristics of the reader-enhancing device by establishing a communication channel with the reader-enhancing device and providing the reader-enhancing device with one or more commands via the communication channel which causes the reader-enhancing device to change one or more of its operating characteristics; and
wherein the reader-enhancing device, prior to changing one or more of its operating characterizes, is absent operating characteristics enabling the reader-enhancing device to perform at least one of providing the output and receiving the input.

13. The method of claim 1, wherein the reader-enhancing device is configured to reject credentials having a location identifier, company identifier, or site code different from a predetermined location identifier, a predetermined company identifier, or a predetermined site code, respectively.

14. The method of claim 1, wherein the reader-enhancing device is configured to receive a user-provided input and based on the user-provided input generate an output which emulates the first type of credential.

15. The method of claim 14, wherein the output generated based on the user-provided input comprises an alteration of the user-provided input into a format used by the first type of credential.

16. The method of claim 14, wherein the output generated based on the user-provided input comprises an emulation template that is known by the reader-enhancing device, before transmission of the output to the reader, to be evaluated as valid by the reader.

17. A non-transitory computer-readable medium comprising processor-executable instructions that, when executed by a processor of the terminal, perform the method of claim 1.

18. A method, comprising:
securing a reader-enhancing device on or within read range of a reader, wherein the reader is natively configured to only process data from a first type of credential, wherein the reader-enhancing device is configured to process one or both of data from a second type of credential and user-provided data;
receiving input at the reader-enhancing device;

analyzing the input received at the reader-enhancing device;

determining that the input is not in a format used by the first type of credential; and generating, at the reader-enhancing device, an output which emulates the first type of credential thereby enabling the reader to respond to the input received at the reader-enhancing device, wherein the reader is not configured to read the input received at the reader-enhancing device.

19. The method of claim 18, wherein the reader-enhancing device comprises a sticker that is secured to the reader with an adhesive.

20. The method of claim 18, wherein the reader-enhancing device comprises a face-plate that is secured to the reader with one or more connectors.

21. A reader-enhancing device operating in cooperation with a reader that is configured to only process data from a first type of credential, the reader-enhancing device comprising:

memory including an emulation module configured to generate an output which emulates the first type of credential when the reader-enhancing device receives an input that is not in a format used by the first type of credential, wherein the output generated by the emulation module enables the reader to respond to the input even though the input is not in a format used by the first type of credential or a format that is readable by the reader; and a processor configured to execute the emulation module.

22. The reader-enhancing device of claim 21, wherein the reader-enhancing device comprises a via which enables a user to access a user interface of the reader even though the reader-enhancing device is positioned over a surface of the reader which comprises the user interface.

* * * * *